United States Patent
Chen et al.

(10) Patent No.: US 11,775,769 B2
(45) Date of Patent: Oct. 3, 2023

(54) SENTENCE TYPE RECOGNITION METHOD AND APPARATUS, ELECTRONIC DEVICE, AND STORAGE MEDIUM

(71) Applicant: BEIJING CENTURY TAL EDUCATION TECHNOLOGY CO., LTD., Beijing (CN)

(72) Inventors: Jiahao Chen, Beijing (CN); Weiping Fu, Beijing (CN); Wenbiao Ding, Beijing (CN); Zitao Liu, Beijing (CN)

(73) Assignee: BEIJING CENTURY TAL EDUCATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/147,080

(22) Filed: Dec. 28, 2022

(65) Prior Publication Data
US 2023/0134101 A1 May 4, 2023

Related U.S. Application Data

(63) Continuation of application No. PCT/CN2021/104353, filed on Jul. 2, 2021.

(30) Foreign Application Priority Data

Jul. 6, 2020 (CN) .......................... 202010642759.5

(51) Int. Cl.
*G06F 40/30* (2020.01)
(52) U.S. Cl.
CPC .................................. *G06F 40/30* (2020.01)
(58) Field of Classification Search
CPC ...................................................... G06F 40/30
See application file for complete search history.

(56) References Cited

U.S. PATENT DOCUMENTS

| 5,227,971 A * | 7/1993 | Nakajima | G06F 40/58 704/9 |
| 11,264,140 B1 * | 3/2022 | Tal | G16H 50/20 |

(Continued)

FOREIGN PATENT DOCUMENTS

| CN | 102231278 A | 11/2011 |
| CN | 105261362 A | 1/2016 |

(Continued)

OTHER PUBLICATIONS

PCT international search report of PCT/CN2021/104353 dated Oct. 9, 2021.
(Continued)

*Primary Examiner* — Kevin Ky
(74) *Attorney, Agent, or Firm* — Emerson, Thomson, & Bennett, LLC; Roger D. Emerson; Matt J. Wilson

(57) ABSTRACT

A sentence type recognition method and apparatus, an electronic device, and a storage medium are provided. The method includes: determining a target sentence from a to-be-recognized classroom teaching speech; segmenting the target sentence into a plurality of words, and processing a word vector of each of the plurality of words, to obtain semantic representation information of the target sentence; calculating, when the plurality of candidate sentence types comprise only a question and a non-question, an inner product of the plurality of pieces of dimension information and normalizing the inner product, to obtain a probability that the sentence type corresponding to the semantic representation information is the question; and determining, based on the probability, that the sentence type corresponding to the semantic representation information is the question or the non-question; determining the sentence type corresponding to the semantic representation information as a sentence type of the target sentence.

20 Claims, 5 Drawing Sheets

(56) References Cited

U.S. PATENT DOCUMENTS

| | | | |
|---|---|---|---|
| 2013/0018649 | A1 | 1/2013 | Deshmukh et al. |
| 2016/0217129 | A1* | 7/2016 | Lu .................... G06F 40/284 |
| 2019/0198014 | A1* | 6/2019 | Li ..................... G06F 16/3347 |
| 2020/0142989 | A1* | 5/2020 | Bordawekar ............ G06N 5/04 |
| 2020/0349199 | A1* | 11/2020 | Jayaraman ............ G06F 40/284 |
| 2021/0150255 | A1* | 5/2021 | Wang ..................... G06F 18/22 |
| 2022/0051479 | A1* | 2/2022 | Agarwal ................ G06N 3/045 |
| 2022/0093088 | A1* | 3/2022 | Rangarajan Sridhar .................... G06F 16/338 |
| 2022/0113988 | A1* | 4/2022 | Swvigaradoss ..... G06F 3/04842 |
| 2022/0138508 | A1* | 5/2022 | Huang ................. G06F 18/241 382/181 |
| 2022/0147720 | A1* | 5/2022 | Wang ..................... G06F 40/58 |
| 2022/0147770 | A1* | 5/2022 | Jain ........................ G06F 40/30 |
| 2022/0157300 | A1* | 5/2022 | Sharifi ................. G10L 15/083 |
| 2023/0134101 | A1* | 5/2023 | Chen ...................... G06F 40/30 704/9 |

FOREIGN PATENT DOCUMENTS

| | | | |
|---|---|---|---|
| CN | 106528530 | A | 3/2017 |
| CN | 107357781 | A | 11/2017 |
| CN | 108415980 | A | 8/2018 |
| CN | 109408627 | A | 3/2019 |
| CN | 109918376 | A | 6/2019 |
| CN | 110321419 | A | 10/2019 |
| CN | 110502738 | A | 11/2019 |
| CN | 110619051 | A | 12/2019 |
| CN | 111125331 | A | 5/2020 |
| CN | 111753553 | A | 10/2020 |

OTHER PUBLICATIONS

The first office action of Chinese application No. 202010642759.5 dated Jan. 11, 2022.
The second office action of Chinese application No. 202010642759.5 dated Feb. 28, 2022.
The third office action of Chinese application No. 202010642759.5 dated Apr. 13, 2022.
Blanchard, N. et al., Identifying teacher questions using automatic speech recognition in classrooms. In: Proceedings of the SIGDIAL 2016 Conference, The 17th Annual Meeting of the Special Interest Group on Discourse and Dialogue, Sep. 13-15, 2016, Los Angeles, CA, USA. pp. 191{201 (2016).
Devlin, J. et al., BERT: pre-training of deep bidirectional transformers for language understanding. In: Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers). pp. 4171{4186 (2019).
Hashimoto, K. et al., A joint many-task model: Growing a neural network for multiple NLP tasks. CORR abs/1611.01587 (2016), no date available.
Wei, J. et al., NEZHA: neural contextualized representation for chinese language understanding. CoRR abs/1909.00204 (2019), no date available.

* cited by examiner

SENTENCE TYPE RECOGNITION METHOD AND APPARATUS, ELECTRONIC DEVICE, AND STORAGE MEDIUM

CROSS REFERENCE TO RELATED APPLICATIONS

The present disclosure is a continuation of international application No. PCT/CN2021/104353 filed on Jul. 2, 2021, which claims priority to "Chinese Patent Application No. 202010642759.5 filed on Jul. 6, 2020 and entitled "SENTENCE TYPE RECOGNITION METHOD AND APPARATUS, ELECTRONIC DEVICE AND STORAGE MEDIUM", the disclosure of which is hereby incorporated by reference in its entirety.

TECHNICAL FIELD

The present disclosure relates to the field of natural language processing, and in particular, to a sentence type recognition method and apparatus, an electronic device, and a storage medium.

BACKGROUND

Teachers utilize various pedagogical techniques in their classrooms to insipre student's thought and study. These pedagogical techniques include asking questions, assigning small-group work, and the like. Asking questions is one of key pedagogical techniques s of the teachers in classroom teaching. Asking questions can increase interactions between the teachers and the students, increase a degree of participation of the students, and enable the teachers and the students to have open discussions and understand each other's thoughts, and can also cause students to think more deeply.

Analysis of teachers' questions in the classrooms can greatly help the teachers to gradually improve quality of teaching. However, due to a large amount and diverse types of teachers' utterances in classroom, a traditional natural language processing method cannot accurately recognize types of sentences in the teachers' utterances.

SUMMARY

Embodiments of the present disclosure provide a sentence type recognition method and apparatus, an electronic device, and a storage medium, to resolve problems of related arts. A technical solution is as follows:

According to a first aspect, an embodiment of the present disclosure provides a sentence type recognition method, including:
  determining a target sentence from a to-be-recognized classroom teaching speech;
  obtaining corresponding semantic representation information based on the target sentence;
  selecting, from a plurality of candidate sentence types, a sentence type corresponding to the semantic representation information; and
  determining the sentence type corresponding to the semantic representation information as a sentence type of the target sentence.

In an implementation, the plurality of candidate sentence types include a non-question and a plurality of types of questions.

The step of selecting, from a plurality of candidate sentence types, a sentence type corresponding to the semantic representation information includes:
  determining, for each of the plurality of candidate sentence types, a probability that the sentence type corresponding to the semantic representation information is the candidate sentence type; and
  determining, based on the probability corresponding to each of the candidate sentence types, the sentence type corresponding to the semantic representation information.

In an implementation, the step of determining, based on the probability corresponding to each of the candidate sentence types, the sentence type corresponding to the semantic representation information includes:
  selecting a maximum probability from the probability corresponding to each of the candidate sentence types; and
  determining a sentence type corresponding to the maximum probability as the sentence type corresponding to the semantic representation information.

In an implementation, the plurality of types of questions include an open question, a knowledge-solicitation question, a discourse-management question, and a procedural question.

In an implementation, the plurality of candidate sentence types include a question and a non-question.

The step of selecting, from a plurality of candidate sentence types, a sentence type corresponding to the semantic representation information includes:
  determining a probability that the sentence type corresponding to the semantic representation information is the question; and
  determining, based on the probability, that the sentence type corresponding to the semantic representation information is the question or the non-question.

In an implementation, the semantic representation information includes a plurality of pieces of dimension information, and the step of determining a probability that the sentence type corresponding to the semantic representation information is the question includes:
  calculating an inner product of the plurality of pieces of dimension information and normalizing the inner product, to obtain the probability that the sentence type corresponding to the semantic representation information is the question.

In an implementation, the method further includes:
performing word segmentation on the target sentence, to obtain information about at least one word corresponding to each target sentence as characteristic information of the target sentence.

The step of obtaining corresponding semantic representation information based on the target sentence includes:
  obtaining the corresponding semantic representation information based on the information about at least one word in the target sentence.

According to a second aspect, an embodiment of the present disclosure provides a sentence type recognition apparatus, including:
  a semantic recognition model, configured obtain corresponding semantic representation information based on a target sentence that is determined from a to-be-recognized classroom teaching speech; and
  a classifier, configured to select, from a plurality of candidate sentence types, a sentence type corresponding to the semantic representation information as a sentence type of the target sentence.

In an implementation, the plurality of candidate sentence types include a non-question and a plurality of types of questions; and the classifier includes a plurality of first probability calculation models respectively corresponding to the plurality of candidate sentence types and a first decision-making unit.

Each of the plurality of first probability calculation models is configured to determine a probability that the sentence type corresponding to the semantic representation information is the candidate sentence type corresponding to the first probability calculation model.

The first decision-making unit is configured to determine, based on the probability corresponding to each of the plurality of candidate sentence types, the sentence type corresponding to the semantic representation information.

In an implementation, the first decision-making unit is configured to select a maximum probability from the probabilities respectively determined by the plurality of first probability calculation models, and determine a sentence type corresponding to the maximum probability as the sentence type corresponding to the semantic representation information.

In an implementation, the plurality of types of questions include an open question, a knowledge-solicitation question, a discourse-management question, and a procedural question.

In an implementation, the plurality of candidate sentence types include a question and a non-question. The classifier includes a second probability calculation model and a second decision-making unit.

The second probability calculation model is configured to determine a probability that the sentence type corresponding to the semantic representation information is the question.

The second decision-making unit is configured to determine, based on the probability, that the sentence type corresponding to the semantic representation information is the question or the non-question.

In an implementation, the semantic representation information includes a plurality of pieces of dimension information.

The second probability calculation model is configured to calculate an inner product of the plurality of pieces of dimension information and normalize the inner product, to obtain the probability that the sentence type corresponding to the semantic representation information is a question.

In an implementation, the apparatus further includes:
a word segmenter, configured to perform word segmentation on the target sentence, to obtain information about at least one word in the target sentence.

The semantic recognition model is further configured to obtain corresponding semantic representation information based on the information about at least one word in the target sentence.

According to a third aspect, an embodiment of the present disclosure provides an electronic device. The electronic device includes a memory and a processor. The memory and the processor communicate with each other through an internal connection path. The memory is configured to store instructions. The processor is configured to execute the instructions stored in the memory, and when the processor executes the instructions stored in the memory, the processor is enabled to perform the method in any implementation of the foregoing aspects.

According to a fourth aspect, an embodiment of the present disclosure provides a computer-readable storage medium. The computer-readable storage medium stores a computer program. When the computer program is run on a computer, the method in any implementation of the foregoing aspects is performed.

Advantages or beneficial effects of the foregoing technical solution include at least:

In the embodiments of the present disclosure, the semantic representation information of the target sentence determined from the classroom teaching speech is determined first, and then a corresponding sentence type is selected based on the semantic representation information. Therefore, in the embodiments of the present disclosure, the target sentences are classified based on semantic understanding, thereby improving classification accuracy of the target sentences, facilitating recognition of diversified sentence types, and helping improve teaching quality.

The foregoing summary is only for the purposes of the specification and is not intended to be construed as a limitation in any way. In addition to the schematic aspects, implementations, and features described above, further aspects, implementations, and features of the present disclosure will be readily apparent from the accompanying drawings and the following detailed descriptions.

BRIEF DESCRIPTION OF THE DRAWINGS

In the drawings, unless otherwise specified, same reference numerals throughout a plurality of drawings indicate same or similar components or elements. These drawings are not necessarily drawn to scale. It should be understood that these drawings depict only some embodiments of the present disclosure and should not be considered as limiting the scope of the present disclosure.

DETAILED DESCRIPTION

In the following, only some exemplary embodiments are briefly described. As those skilled in the art may appreciate, the described embodiments may be modified in various different ways without departing from the spirit or scope of the present disclosure. Therefore, the drawings and descriptions are considered to be exemplary rather than limiting in nature.

Figure 1:
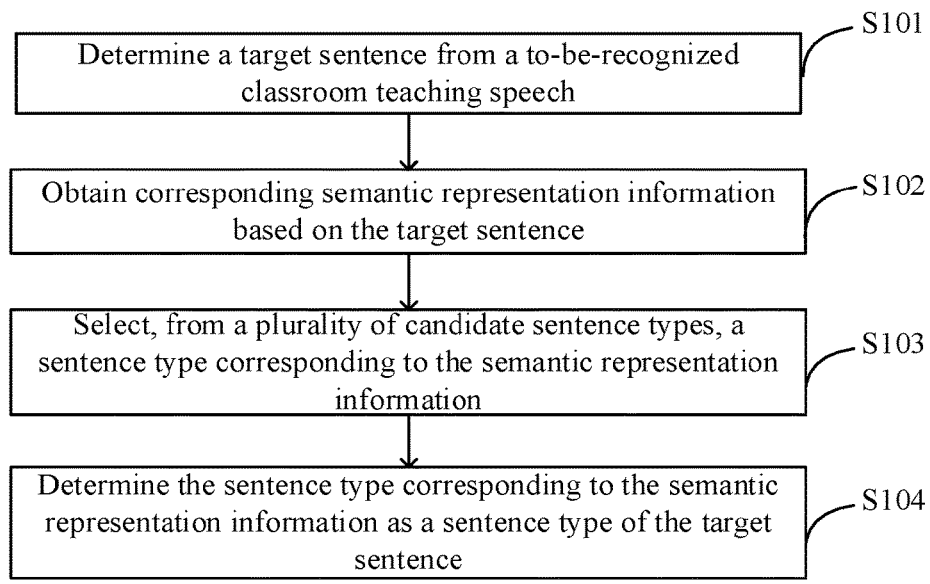
FIG. 1 is a schematic diagram of a sentence type recognition method according to an embodiment of the present disclosure.

FIG. 1 shows a schematic diagram of a sentence type recognition method according to an embodiment of the present disclosure. As shown in FIG. 1, the method may include:

step S101, determining a target sentence from a to-be-recognized classroom teaching speech;

step S102, obtaining corresponding semantic representation information based on the target sentence;

step S103, selecting, from a plurality of candidate sentence types, a sentence type corresponding to the semantic representation information; and step S104, determining the sentence type corresponding to the semantic representation information as a sentence type of the target sentence.

In practice, all or some of sentences in the classroom teaching speech may be determined as target sentences. A number of the target sentences can be one or more. For each of the plurality of target sentences, the steps S102 to S104 are separately performed, to obtain a sentence type corresponding to each target sentence.

For example, the target sentence may be a sentence in a text format. Text recognition can be performed on a classroom teaching speech in an audio format, to obtain a target sentence in a text format.

Figure 2:
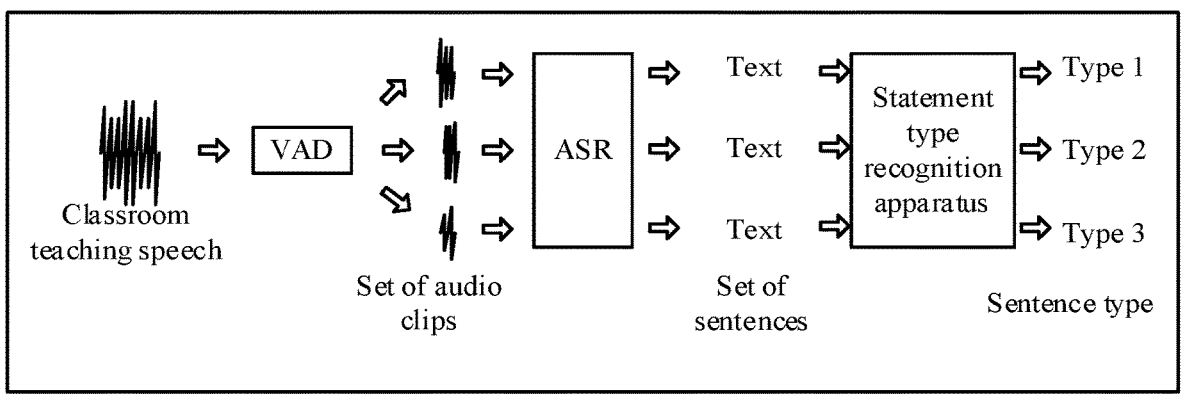
FIG. 2 is a schematic diagram of a process of processing a classroom teaching speech according to an embodiment of the present disclosure.

For example, as shown in FIG. 2, a Voice Activity Detection (VAD) technology is used to extract a set of audio clips including human voice from a piece of classroom teaching speech. Then, an Automatic Speech Recognition (ASR) technology is used to transcript each audio clip in the set of audio clips, to obtain a set of sentences in a text format, and operations such as segmentation and selection are performed on the set of sentences to obtain a target sentence. Then, the target sentence is input to a sentence type recognition apparatus that can perform the steps S102 and S103, to obtain a sentence type of the target sentence, for example, a type 1, a type 2, or a type 3.

For example, the sentence type recognition model may include a semantic recognition model and a classifier. The semantic recognition model may output corresponding semantic representation information based on the input target sentence or characteristic information of the target sentence. The plurality of candidate sentence types are used as classification results of the classifier, the semantic representation information is input to the classifier, and one of the plurality of candidate sentence types can be output by the classifier as a sentence type corresponding to a semantic representation vector.

In an example, the semantic recognition model may include a Transformer model, a Bi-directional Long Short-Term Memory (BiLSTM) model, a bidirection gated recurrent unit (BiGRU) model, or the like. The classifier may include one or more Multilayer Perceptron, multilayer perceptrons (MLPs) or Convolutional Neural Networks (CNNs).

In an exemplary implementation, before the step S102, the sentence type recognition method may further include:

perform word segmentation on the target sentence, to obtain information about at least one word in the target sentence.

Accordingly, in the step S102, the obtaining corresponding semantic representation information based on the target sentence includes: obtaining the corresponding semantic representation information based on the information about at least one word in the target sentence.

For example, the target sentence is segmented into P words, and each word is mapped to a corresponding word vector, to obtain a set of P word vectors (X1, X2, . . . , XP), where each word vector may be a multi-dimensional vector, for example, a 200-dimension vector XI=(E1, E2, . . . , E200). The word vector is, for example, a one-hot vector or a distributed word vector.

In the exemplary implementation, the target sentence is first mapped to word vectors such that the target sentence can be represented by using a machine language. This is conducive to accurately obtaining the characteristic information of the target sentence.

For example, the semantic representation information may also include a plurality of pieces of dimension information. That is, the semantic representation information may also be represented by using a multi-dimensional vector.

Figure 3:
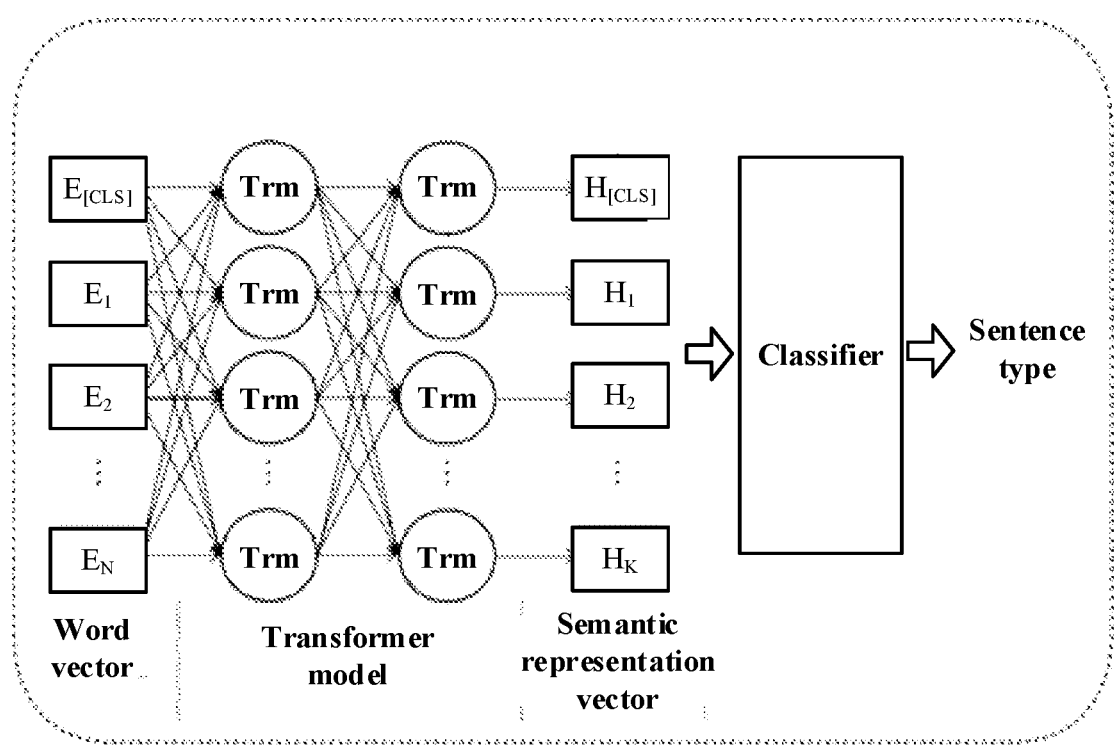
FIG. 3 is a schematic diagram of a sentence type recognition method according to an embodiment of the present disclosure.

For example, as shown in FIG. 3, each N-dimensional word vector E[CLS] of the target sentence and corresponding dimension information E1 to EN are input into the semantic recognition model, for example, the Transformer (Trm) model. The Transformer model processes each word vector and outputs a semantic representation vector H[CLS]. The semantic representation vector may include K pieces of dimension information H1 to HK, for example, K=128, and the semantic representation vector is a 128-dimensional vector. The semantic representation vector is input to the classifier, and a sentence type corresponding to the semantic representation vector can be output by the classifier as the sentence type of the target sentence.

In the embodiments of the present disclosure, the semantic representation information of the target sentence determined from the classroom teaching speech is determined first, and then a corresponding sentence type is selected based on the semantic representation information. Therefore, in the embodiments of the present disclosure, the target sentences are classified based on semantic understanding, thereby improving classification accuracy of the target sentences, and facilitating recognition of diversified sentence types.

With the method in this embodiment of the present disclosure, a question can be recognized, and a specific type of question can be recognized. For example, a question may be classified into the following types:

1. Open question: a question that triggers thinking, for example, a question with no deterministic answer and related to teaching content. For example, a question is used for enabling a student to talk about a topic, point out a knowledge point or provide a summary, and perform analysis or speculation, such as: "How to solve this problem?", "Why are you wrong about this question?", "Can you tell me your thoughts?", "So what's your final conclusion?", "What kind of thing and what kind of principle?", "How to do in the second way?", "What should this structure look like?", or the like.

2. Knowledge-solicitation question: for example, a question with a standard answer and related to teaching content, such as: "What is its distance?", "What are the force-applying object and the stressed object respectively?", "What is the answer to this question?", or "What is a quadrilateral?".

3. Discourse-management question: for example, a question that is not related to teaching content and is mainly used to attract attention, including "Isn't it?", "Right?", "Right or wrong?", "Yes or no?", or the like. For example, "Yes. Is that the same for the previous question?", "It's possible, right?", "For what? Because . . . ", or the like is not a question that must be answered.

4. Procedural question: for example, a question that is not related to teaching content but is related to a teaching procedure, such as a question for reading a question, debugging equipment, greeting a student, or asking about a recent life. The question may be, for example, "How's it going?", "Can you hear me?", "Do you have any questions?", "Let's finish the questions first, and then I'll tell you these.", "Did I tell you?", or "Where were we?".

It can help to evaluate and improve teaching quality by classifying questions into the foregoing plurality of types and using the method provided in this embodiment of the present disclosure to recognize the sentence type of the target sentence in the classroom teaching speech. For example, by counting proportions of open questions and knowledge-solicitation questions, it is possible to assess whether a teacher is good at guiding students to think. For another example, by recognizing a knowledge-solicitation question and determining responses to the knowledge-solicitation question, students' mastery of teaching content in the classroom may be understood. This helps teachers to adjust a teaching progress. For still another example, by counting a proportion of discourse-management questions or procedural questions in all sentences, a teaching efficiency of a teacher may be evaluated, whether a teaching process is smooth may be understood, and a teaching environment may be improved or the teacher may be reminded to improve the efficiency.

In an implementation, the plurality of candidate sentence types in the step S103 include a non-question and a plurality of types of questions. The step of selecting, from a plurality of candidate sentence types, a sentence type corresponding to the semantic representation information may include:
  determining, for each of the plurality of candidate sentence types, a probability that the sentence type corresponding to the semantic representation information is the candidate sentence type; and
  determining, based on the probability corresponding to each candidate sentence type, the sentence type corresponding to the semantic representation information.

Figure 4:
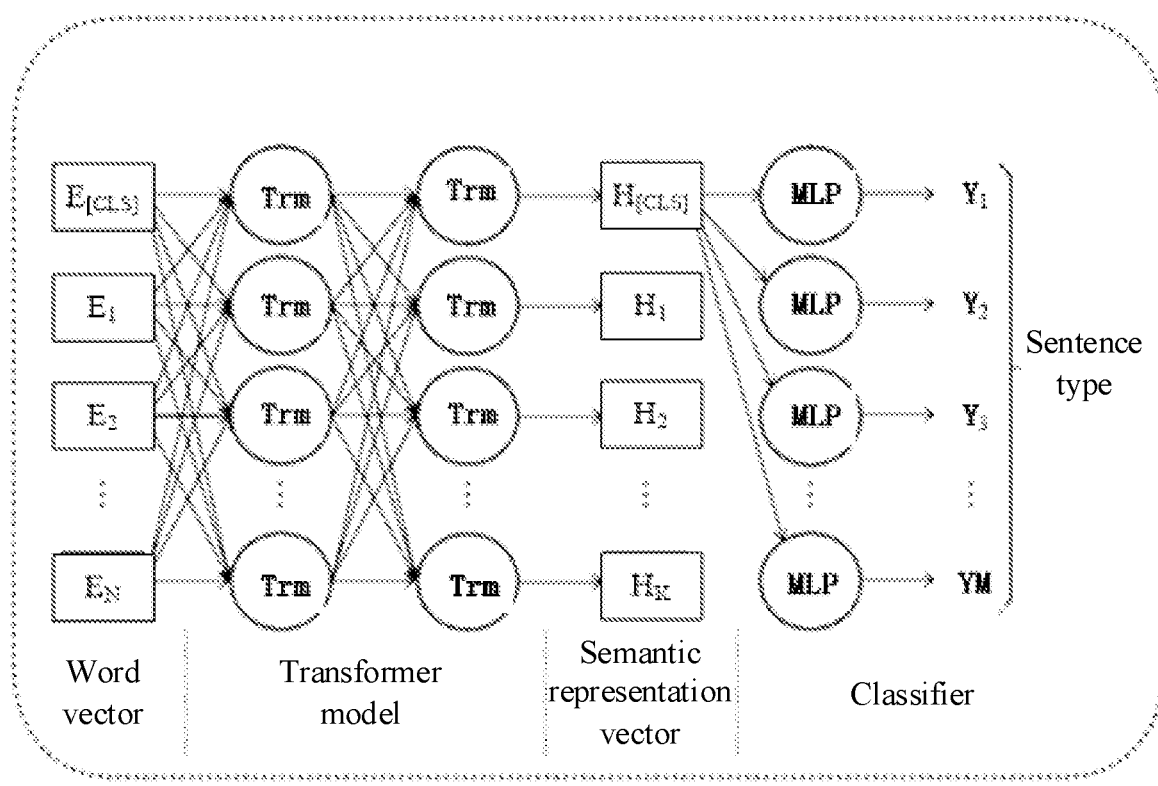
FIG. 4 is a schematic diagram of a sentence type recognition method according to an embodiment of the present disclosure.

For example, with reference to FIG. 4, the semantic representation vector H[CLS] is input into the classifier. The classifier includes a plurality of probability calculation models, such as MLPs in the figure. Alternatively, a DNN model may be used, for example, a DNN model including three convolutional layers of sizes 128, 64, and 32 respectively. Each probability calculation model corresponds to a candidate sentence type, including a non-question Y1 and a plurality of types of questions Y2 to YM. Each MLP calculates a probability that a sentence type corresponding to the semantic representation vector H[CLS] is Y corresponding to the MLP, so that the sentence type corresponding to the semantic representation information can be determined by using the candidate sentence types Y1 to YM.

For example, before the sentence type corresponding to the semantic representation information is determined, the probabilities corresponding to the plurality of candidate sentence types may be normalized to convert the probabilities of the plurality of candidate sentence types into a same distribution space, to improve accuracy of determining a sentence type. For example, a plurality of probabilities are normalized using softmax.

For example, the step of determining, based on the probability corresponding to each candidate sentence type, the sentence type corresponding to the semantic representation information may include:
  selecting a maximum probability from the probability corresponding to each candidate sentence type; and
  determining a sentence type corresponding to the maximum probability as the sentence type corresponding to the semantic representation information.

In the foregoing implementation, for different candidate question types, different probability calculation models may be obtained, to separately calculate probabilities corresponding to the candidate question types. Therefore, a more accurate probability calculation model can be obtained by using more targeted training data or using a more targeted network structure, to further improve accuracy of recognizing a sentence type.

In an implementation, the candidate sentences may also include a question and a non-question. In this case, the step S103 of selecting, from a plurality of candidate sentence types, a sentence type corresponding to the semantic representation information includes:
  determining a probability that the sentence type corresponding to the semantic representation information is the question; and
  determining, based on the probability, that the sentence type corresponding to the semantic representation information is the question or the non-question.

For example, if a probability calculation model determines that the probability that the sentence type corresponding to the semantic representation information is the question is 0.6, and the probability is greater than a threshold 0.5, the sentence type corresponding to the semantic representation information is determined as the question. In a specific implementation, the threshold is increased or decreased according to an actual application scenario requirement, for example, a need to improve accuracy of a recognized question or a need to recognize all questions.

For example, an inner product of a plurality of pieces of dimension information may be calculated and normalized, to obtain the probability that the sentence type corresponding to the semantic representation information is the question.

In this embodiment of the present disclosure, a sentence type is determined based on the semantic representation information, and the sentence type recognition accuracy is improved to some extent. Therefore, when only the question and the non-question need to be recognized, a plurality of pieces of dimension information can be comprehensively summarized by calculating the inner product, and then the inner product is normalized, so that a recognition result whose accuracy meets a requirement can be obtained and the calculation complexity can be reduced.

In summary, in this embodiment of the present disclosure, the semantic representation information of the target sentence determined from the classroom teaching speech is determined first, and then a corresponding sentence type is selected based on the semantic representation information. Therefore, in the embodiments of the present disclosure, the target sentences are classified based on semantic understanding, thereby improving classification accuracy of the target sentences, facilitating recognition of diversified sentence types, and helping improve teaching quality.

Figure 5:
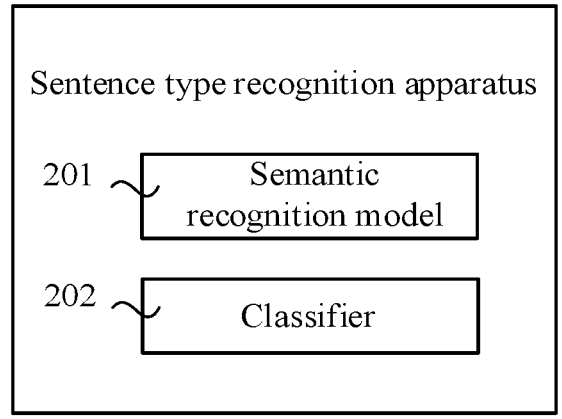
FIG. 5 is a schematic diagram of a sentence type recognition apparatus according to an embodiment of the present disclosure.

FIG. 5 shows a schematic diagram of a sentence type recognition apparatus according to an embodiment of the present disclosure. The apparatus may be an electronic device for performing the foregoing sentence type recognition method, or may be a sentence type recognition model, for example, a model shown in FIG. 3 or FIG. 4.

As shown in FIG. 5, the apparatus may include:
- a semantic recognition model 201, configured to obtain, based on a target sentence that is determined from a to-be-recognized classroom teaching speech, semantic representation information corresponding to the target sentence; and
- a classifier 202, configured to select, from a plurality of candidate sentence types, a sentence type corresponding to the semantic representation information as a sentence type of the target sentence.

Figure 6:
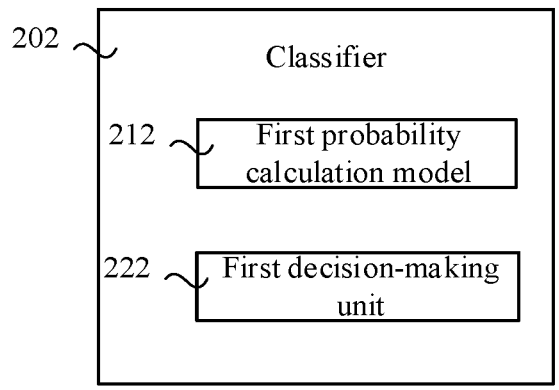
FIG. 6 is a schematic diagram of a sentence type recognition apparatus according to an embodiment of the present disclosure.

In an implementation, the plurality of candidate sentence types include a non-question and a plurality of types of questions. As shown in FIG. 6, the classifier 202 includes a plurality of first probability calculation models 212 respectively corresponding to the plurality of candidate sentence types and a first decision-making unit 222.

Each of the plurality of first probability calculation models 212 is configured to determine, for a candidate sentence type corresponding the first probability calculation model, a probability that the sentence type corresponding to the semantic representation information is the candidate sentence type.

The first decision-making unit 222 is configured to determine, based on the probability corresponding to each candidate sentence type, the sentence type corresponding to the semantic representation information.

For example, the first decision-making unit 222 is configured to select a maximum probability from the probability corresponding to each candidate sentence type, and determine a sentence type corresponding to the maximum probability as the sentence type corresponding to the semantic representation information.

For example, the plurality of types of questions include an open question, a knowledge-solicitation question, a discourse-management question, and a procedural question.

Figure 7:
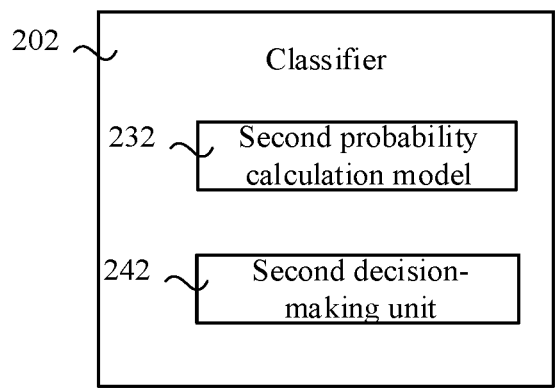
FIG. 7 is a schematic diagram of a sentence type recognition apparatus according to an embodiment of the present disclosure.

In an implementation, the plurality of candidate sentence types include a question and a non-question. As shown in FIG. 7, the classifier 202 includes a second probability calculation model 232 and a second decision-making unit 242.

The second probability calculation model 232 is configured to determine a probability that the sentence type corresponding to the semantic representation information is a question.

The second decision-making unit 242 is configured to determine, based on the probability, that the sentence type corresponding to the semantic representation information is a question or a non-question.

For example, the semantic representation information includes a plurality of pieces of dimension information.

The second probability calculation model 232 is configured to calculate an inner product of the plurality of pieces of dimension information and normalize the inner product, to obtain the probability that the sentence type corresponding to the semantic representation information is the question.

Figure 8:
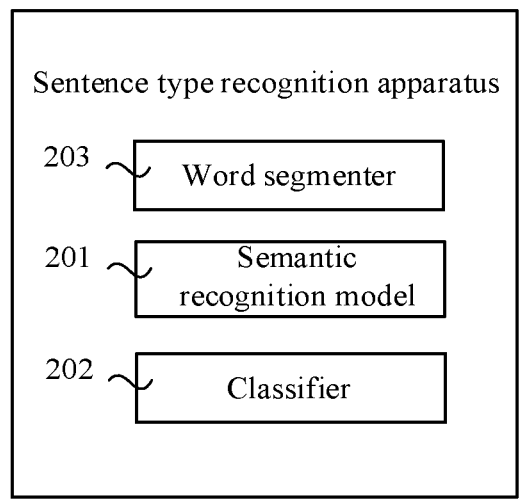
FIG. 8 is a schematic diagram of a sentence type recognition apparatus according to an embodiment of the present disclosure.

In an implementation, as shown in FIG. 8, the apparatus further includes:
- a word segmenter 203, configured to perform word segmentation on the target sentence, to obtain information about at least one word in the target sentence.

The semantic recognition model 201 is further configured to obtain corresponding semantic representation information based on the information about at least one word in the target sentence.

For functions of modules in all apparatuses in this embodiment of the present disclosure, refer to the corresponding descriptions in the foregoing method, and details are not described herein again.

Figure 9:
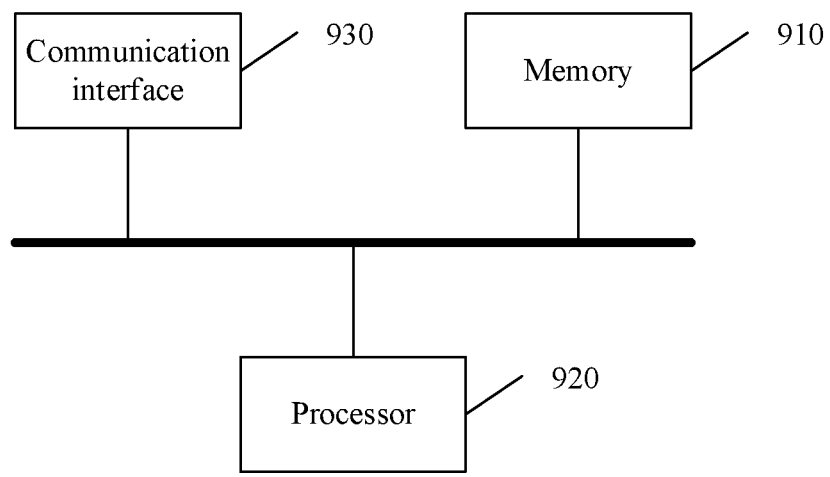
FIG. 9 is a structural block diagram of an electronic device according to an embodiment of the present disclosure.

FIG. 9 shows a structural block diagram of an electronic device according to an embodiment of the present disclosure. As shown in FIG. 9, the electronic device includes a memory 910 and a processor 920. The memory 910 stores a computer program that can be executed on the processor 920. When the processor 920 executes the computer program, the sentence type recognition method in the foregoing embodiment is implemented. A quantity of the memory 910 and a quantity of the processor 920 each may be one or more.

The electronic device further includes:
- a communication interface 930, configured to communicate with an external device, to exchange and transmit data.

If the memory 910, the processor 920, and the communication interface 930 are implemented independently, the memory 910, the processor 920, and the communication interface 930 may be connected to each other and communicate with each other through a bus. The bus may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus can be classified as an address bus, a data bus, a control bus, or the like. For ease of illustration, only one thick line in FIG. 9 is used for represent the bus, but it does not mean that there is only one bus or one type of bus.

Optionally, in a specific implementation, if the memory 910, the processor 920, and the communication interface 930 are integrated on a chip, the memory 910, the processor 920, and the communication interface 930 may communicate with each other through an internal interface.

An embodiment of the present disclosure provides a computer-readable storage medium. The computer-readable storage medium stores a computer program. When the computer program is executed by a processor, the method provided in the embodiment of the present disclosure is implemented.

An embodiment of the present disclosure further provides a chip. The chip includes a processor, configured to invoke instructions from a memory and execute the instructions stored in the memory, so that a communication device mounted with the chip performs the method provided in the embodiment of the present disclosure.

An embodiment of the present disclosure further provides a chip, including an input interface, an output interface, a processor, and a memory. The input interface, the output interface, the processor, and the memory are connected to each other through an internal connection path. The processor is configured to execute code in the memory, and when the code is executed, the processor is configured to perform the method provided in the embodiment of the present disclosure.

It should be understood that the processor may be a central processing unit (CPU), another general-purpose processor, a digital signal processor (DSP), an application specific integrated circuit (ASIC), a field programmable gate array (FPGA), another programmable logic device, a discrete gate or transistor logic device, a discrete hardware component, or the like. The general-purpose processor may be a microprocessor, any conventional processor, or the like. It is worth noting that the processor may be a processor that supports an advanced RISC machine (ARM) architecture.

Further, optionally, the memory may include a read-only memory and a random access memory, and may further include a non-volatile random access memory. The memory may be a volatile memory or a non-volatile memory, or may include both a volatile memory and a non-volatile memory. The non-volatile memory may include a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may include a random access memory (RAM), and functions as an external cache. By way of example but not limitation, many forms of RAMs are available, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The foregoing embodiment may be implemented in whole or in part by using software, hardware, firmware, or any combination thereof. When software is used, the foregoing embodiment may be implemented in whole or in part in the form of a computer program product. The computer program product includes one or more computer instructions. When computer program instructions are loaded and executed on a computer, all or some of processes or functions are generated according to the present disclosure. The computer may be a general-purpose computer, a special-purpose computer, a computer network, or another programmable apparatus. The computer instructions may be stored in a computer-readable storage medium, or transmitted from one computer-readable storage medium to another computer-readable storage medium.

In the description of this specification, with reference to the description of the term, for example, "one embodiment", "some embodiments", "an example", "a specific example", or "some examples", means that specific features, structures, materials, or characteristics described with reference to the embodiment or example are included in at least one embodiment or example of the present disclosure. Further, the described specific features, structures, materials, or characteristics may be incorporated in an appropriate manner in any one or more embodiments or examples. In addition, without contradiction, a person skilled in the art may combine different embodiments or examples described in this specification and features of different embodiments or examples.

In addition, the terms "first" and "second" are only used for description and should not be understood as an indication or implication of relative importance or as an implicit indication of a quantity of indicated technical features. Therefore, a feature defined with "first" or "second" may explicitly or implicitly include at least one of the features. In the description of the present disclosure, "a plurality of" means two or more, unless otherwise specified.

Any process or method description in a flowchart or described herein in another way may be understood as representing a module, segment, or portion of code including one or more executable instructions for implementing steps of a particular logical function or process. In addition, the scope of preferred implementations of the present disclosure includes other implementations, and the implementations may not be performed in a sequence shown or discussed, including: performing functions in a basically simultaneous manner or in a reverse sequence based on the functions.

Logic and/or steps represented in the flowchart or described herein in another manner, for example, may be considered as a sequencing list of executable instructions for implementing logical functions, and may be specifically implemented in any computer-readable medium for use by or in combination with an instruction execution system, apparatus, or device (for example, a computer-based system, a system including a processor, or another system that may fetch and execute instructions from the instruction execution system, apparatus, or device).

It should be understood that all parts of the present disclosure may be implemented by using hardware, software, firmware, or a combination thereof. In the foregoing implementations, a plurality of steps or methods may be implemented by using software or firmware stored in a memory and executed by a proper instruction execution system. All or some of the steps of the method in the foregoing embodiment may be completed by a program instructing related hardware. The program may be stored in a computer-readable storage medium. When the program is executed, one or a combination of the steps in the method embodiment is included.

In addition, functional units in the embodiments of the present disclosure may be integrated into one processing module, each unit may exist alone physically, or two or more units may be integrated into one module. The integrated module may be implemented in the form of hardware or implemented in the form of a soft function module. If the integrated module is implemented in the form of a software function module and sold or used as an independent product, the integrated module may alternatively be stored in a computer-readable storage medium. The storage medium may be a read-only memory, a magnetic disk, an optical disc, or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A sentence type recognition method, comprising:
    determining a target sentence from a to-be-recognized classroom teaching speech;
    segmenting the target sentence into a plurality of words, and processing a word vector of each of the plurality of words, to obtain semantic representation information of the target sentence, wherein the semantic representation information comprises a plurality of pieces of dimension information;
    selecting, from a plurality of candidate sentence types, a sentence type corresponding to the semantic representation information; and
    determining the sentence type corresponding to the semantic representation information as a sentence type of the target sentence, wherein the step of selecting, from a plurality of candidate sentence types, a sentence type corresponding to the semantic representation information comprises:
    calculating, when the plurality of candidate sentence types comprise only a question and a non-question, an inner product of the plurality of pieces of dimension information and normalizing the inner product, to obtain a probability that the sentence type corresponding to the semantic representation information is the question; and
    determining, based on the probability, that the sentence type corresponding to the semantic representation information is the question or the non-question.

2. The method according to claim 1, wherein the plurality of candidate sentence types comprise a non-question and a plurality of types of questions; and
    the step of selecting, from a plurality of candidate sentence types, a sentence type corresponding to the semantic representation information comprises:
        determining, for each of the plurality of candidate sentence types, a probability that the sentence type corresponding to the semantic representation information is the candidate sentence type; and
        determining, based on the probability corresponding to each of the candidate sentence types, the sentence type corresponding to the semantic representation information.

3. The method according to claim 2, wherein the step of determining, based on the probability corresponding to each of the candidate sentence types, the sentence type corresponding to the semantic representation information comprises:
    selecting a maximum probability from the probability corresponding to each of the candidate sentence types; and
    determining a sentence type corresponding to the maximum probability as the sentence type corresponding to the semantic representation information.

4. The method according to claim 3, wherein the plurality of types of questions comprise an open question, a knowledge-solicitation question, a discourse-management question, and a procedural question.

5. The method according to claim 1, wherein the method further comprises: performing word segmentation on the target sentence, to obtain information about at least one word in the target sentence; and
    the step of segmenting the target sentence into a plurality of words, and processing a word vector of each of the plurality of words, to obtain semantic representation information of the target sentence comprises: obtaining corresponding semantic representation information based on the information about at least one word in the target sentence.

6. An electronic device, comprising a processor and a memory, wherein the memory stores instructions, and the instructions are loaded and executed by the processor, to implement the method according to claim 1.

7. The electronic device according to claim 6, wherein the plurality of candidate sentence types comprise a non-question and a plurality of types of questions; and
    the step of selecting, from a plurality of candidate sentence types, a sentence type corresponding to the semantic representation information comprises:
        determining, for each of the plurality of candidate sentence types, a probability that the sentence type corresponding to the semantic representation information is the candidate sentence type; and
        determining, based on the probability corresponding to each of the candidate sentence types, the sentence type corresponding to the semantic representation information.

8. The electronic device according to claim 7, wherein the step of determining, based on the probability corresponding to each of the candidate sentence types, the sentence type corresponding to the semantic representation information comprises:
    selecting a maximum probability from the probability corresponding to each of the candidate sentence types; and
    determining a sentence type corresponding to the maximum probability as the sentence type corresponding to the semantic representation information.

9. The electronic device according to claim 8, wherein the plurality of types of questions comprise an open question, a knowledge-solicitation question, a discourse-management question, and a procedural question.

10. The electronic device according to claim 6, wherein the instructions are loaded and executed by the processor, to implement the following operation: performing word segmentation on the target sentence, to obtain information about at least one word in the target sentence; and
    the step of segmenting the target sentence into a plurality of words, and processing a word vector of each of the plurality of words, to obtain semantic representation information of the target sentence comprises: obtaining corresponding semantic representation information based on the information about at least one word in the target sentence.

11. A sentence type recognition apparatus, comprising:
    a semantic recognition model, configured to segment a target sentence determined from a to-be-recognized classroom teaching speech into a plurality of words, and process a word vector of each of the plurality of words, to obtain semantic representation information of the target sentence, wherein the semantic representation information comprises a plurality of pieces of dimension information; and
    a classifier, configured to select, from a plurality of candidate sentence types, a sentence type corresponding to the semantic representation information as a sentence type of the target sentence, wherein
    the classifier comprises a second probability calculation model and a second decision-making unit;
    the second probability calculation model is configured to: calculate, when the plurality of candidate sentence types comprise only a question and a non-question, an inner product of the plurality of pieces of dimension information and normalize the inner product, to obtain a probability that the sentence type corresponding to the semantic representation information is the question; and
    the second decision-making unit is configured to determine, based on the probability, that the sentence type corresponding to the semantic representation information is the question or the non-question.

12. The apparatus according to claim 11, wherein the plurality of candidate sentence types comprise a non-question and a plurality of types of questions; and the classifier comprises a plurality of first probability calculation models respectively corresponding to the plurality of candidate sentence types and a first decision-making unit, wherein
    each of the plurality of first probability calculation models is configured to determine a probability that the sentence type corresponding to the semantic representation information is the candidate sentence type corresponding to the first probability calculation model; and the first decision-making unit is configured to determine, based on the probability corresponding to each of the plurality of candidate sentence types, the sentence type corresponding to the semantic representation information.

13. The apparatus according to claim 12, wherein the first decision-making unit is configured to select a maximum probability from the probability corresponding to each of the candidate sentence types, and determine a sentence type corresponding to the maximum probability as the sentence type corresponding to the semantic representation information.

14. The apparatus according to claim 12, wherein the plurality of types of questions comprise an open question, a knowledge-solicitation question, a discourse-management question, and a procedural question.

15. The apparatus according to claim 11, wherein the apparatus further comprises:
 a word segmenter, configured to perform word segmentation on the target sentence, to obtain information about at least one word in the target sentence; and
 the semantic recognition model is further configured to obtain corresponding semantic representation information based on the information about at least one word in the target sentence.

16. A non-transitory computer-readable storage medium, wherein the computer-readable storage medium stores a computer program, and the computer program is executed by a processor to implement the following operations:
 determining a target sentence from a to-be-recognized classroom teaching speech;
 segmenting the target sentence into a plurality of words, and processing a word vector of each of the plurality of words to obtain semantic representation information of the target sentence, wherein the semantic representation information comprises a plurality of pieces of dimension information;
 selecting, from a plurality of candidate sentence types, a sentence type corresponding to the semantic representation information; and
 determining the sentence type corresponding to the semantic representation information as a sentence type of the target sentence, wherein
 the operations of selecting, from a plurality of candidate sentence types, a sentence type corresponding to the semantic representation information comprises:
  calculating, when the plurality of candidate sentence types comprise only a question and a non-question, an inner product of the plurality of pieces of dimension information and normalizing the inner product, to obtain a probability that the sentence type corresponding to the semantic representation information is the question; and
  determining, based on the probability, that the sentence type corresponding to the semantic representation information is the question or the non-question.

17. The non-transitory computer-readable storage medium according to claim 16, wherein the plurality of candidate sentence types comprise a non-question and a plurality of types of questions; and
 the operation of selecting, from a plurality of candidate sentence types, a sentence type corresponding to the semantic representation information comprises:
  determining, for each of the plurality of candidate sentence types, a probability that the sentence type corresponding to the semantic representation information is the candidate sentence type; and
  determining, based on the probability corresponding to each of the candidate sentence type, the sentence type corresponding to the semantic representation information.

18. The non-transitory computer-readable storage medium according to claim 17, wherein the operation of determining, based on the probability corresponding to each of the candidate sentence types, the sentence type corresponding to the semantic representation information comprises:
 selecting a maximum probability from the probability corresponding to each of the candidate sentence types; and
 determining a sentence type corresponding to the maximum probability as the sentence type corresponding to the semantic representation information.

19. The non-transitory computer-readable storage medium according to claim 18, wherein the plurality of types of questions comprise an open question, a knowledge-solicitation question, a discourse-management question, and a procedural question.

20. The non-transitory computer-readable storage medium according to claim 16, wherein the computer program is executed by the processor to further implement the following operation: performing word segmentation on the target sentence, to obtain information about at least one word in the target sentence; and
 the operation of segmenting the target sentence into a plurality of words, and processing a word vector of each of the plurality of words, to obtain semantic representation information of the target sentence comprises: obtaining corresponding semantic representation information based on the information about at least one word in the target sentence.

* * * * *